United States Patent [19]

Ippolito

[11] Patent Number: 4,569,601

[45] Date of Patent: Feb. 11, 1986

[54] WOUND WIRE BEARING

[75] Inventor: Rodolfo M. Ippolito, Euless, Tex.

[73] Assignee: Dresser Industries, Inc., Dallas, Tex.

[21] Appl. No.: 662,732

[22] Filed: Oct. 19, 1984

Related U.S. Application Data

[62] Division of Ser. No. 413,774, Sep. 1, 1982, Pat. No. 4,514,098.

[51] Int. Cl.⁴ ............... E21B 10/22; E21B 10/24; F16C 33/10
[52] U.S. Cl. ........................... 384/95; 384/93; 384/291; 384/371
[58] Field of Search ............ 384/92, 93, 95, 112, 384/123, 308–371, 291, 292, 283; 175/371, 372

[56] References Cited

U.S. PATENT DOCUMENTS

| | | | |
|---|---|---|---|
| 3,167,366 | 1/1965 | Freund | 384/283 |
| 3,346,302 | 10/1967 | Robinson et al. | 384/368 |
| 4,109,974 | 8/1978 | Svanstrom et al. | 384/95 |
| 4,181,185 | 1/1980 | Keller et al. | 384/93 |
| 4,333,691 | 6/1982 | Cooper | 384/93 |
| 4,427,308 | 1/1984 | Sandberg | 384/123 X |
| 4,446,933 | 5/1984 | Bodine | 384/93 X |

Primary Examiner—Stuart S. Levy
Assistant Examiner—Thomas R. Hannon
Attorney, Agent, or Firm—Fred A. Winans

[57] ABSTRACT

In accordance with an illustrative embodiment of the present invention, a thrust bearing member is positioned between the rolling cutter or cone and the bearing pin of a rock bit and comprises wound wire such as a closed spiral coil spring that provides spaced-apart bearing surfaces with open areas therebetween. The flexibility of the spiral spring tends to spread the load between several bearing areas to thereby reduce concentrations of stress and the occurrence of localized high temperatures and wear, and the spacing of the bearing surfaces provides wear and contamination particle traps as well as lubricant reservoirs, to significantly increase the useful life of the bearing.

8 Claims, 3 Drawing Figures

WOUND WIRE BEARING

This is a division of application Ser. No. 413,774, filed Sept. 1, 1982, now U.S. Pat. No. 4,514,098, issued Apr. 30, 1985.

FIELD OF THE INVENTION

This invention relates generally to journal or friction bearing structures, and specifically to a new and improved thrust bearing for a rolling cone rock bit or roller rock cutter used in drilling well bores.

BACKGROUND OF THE INVENTION

A typical friction or thrust bearing used in rock bits, as shown for example in U.S. Pat. No. 4,330,158, has opposed bearing surfaces formed on opposed axial surfaces of the bearing pin and cone. The surfaces oppose and engage one another as the bit is turned on bottom under load applied by the drill collar string to which the bit is attached. Due to heavy loads that are imposed on the bearings during normal drilling operations, significant amounts of friction and heat are generated which limit the bearing life. Of course it is desirable that the bearing life equal or exceed the life of the cone cutting structure, so that the drill string will not have to be tripped to change the bit before the cutting structure has been worn out.

The usual approach to design of bearings of this type has been to maximize the nominal bearing surface areas within the confines of the structural integrity of the rolling cutters or cones, with the objective of presenting larger and more dispersed contact areas at the load-bearing points. Such bearing structures are susceptible to early damage by contaminant particles or by small particles of metal dislodged as a result of the wearing process which adhere to the bearing surfaces and greatly accelerate the wearing process toward catastrophic failure. There is a need for trapping such particles so that they do not remain between rubbing bearing surfaces. Yet another shortcoming of prior structures is that the plain bearing surfaces have not been sufficiently lubricated to provide for maximum bearing life in the somewhat hostile environment in which drill bits are used. Although grooves in solid bearing members have been suggested heretofore, such structures have limited compliance and are easily worn and damaged at areas of localized concentration of stress and localized high temperatures.

A general object of the present invention is to provide a new and improved thrust bearing structure of the type described having a significantly improved bearing life.

Another object of the present invention is to provide a new and improved rock bit journal bearing that includes open areas for trapping debris particles so that such particles do not interfere with movement between opposed bearing surfaces.

Another object of the present invention is to provide a new and improved rock bit thrust bearing constructed and arranged to provide large spaces adjacent to engaged bearing surfaces for the storage of lubricant and supply thereof to contacting bearing surfaces to reduce wear.

Another object of the present invention is to provide a new and improved rock bit journal bearing constructed and arranged to provide a wiping action of one bearing member over the other to evenly distribute lubricant and thereby reduce wear.

Still another object of the present invention is to provide a new and improved journal bearing structure having spaced bearing surfaces formed by wound wire capable of accommodating some degree of misalignment of parts.

SUMMARY OF THE INVENTION

These and other objects are attained in accordance with the concepts of the present invention through the provision of a thrust bearing structure, particularly useful in a rock bit, where at least one of the opposed bearing members comprises wound wire forming spaced surface areas in actual contact with the surface of the other bearing member. The cross-sectional shape of the wire, which can take numerous forms, is designed such that between the spaced bearing surface areas there are provided recessed regions which form lubricant reservoirs as well as traps for debris such as particles that are dislodged from the bearing surfaces during operation, or which enter the bearing as contamination.

In one embodiment, the wound wire is in the form of a helical coil spring that is mounted in an interior bore of the cone to provide a thrust bearing. The cross-sectional outline of the coils of the spring is defined by axially outer side walls that engage companion side walls of adjacent coils, and axially inner side walls that converge toward one another to provide axially spaced, inwardly facing bearing surfaces in actual contact with the outer thrust surface of the bearing pin. The helical space defined between the inclined inner wall surfaces of adjacent coils provides large areas for containment of lubricant as well as large trap spaces for loose particles. The helical form of the wire spring bearing provides a pumping action as the cutter rotates on the bearing pin so that lubricant is moved radially along the bearing, and so that the bearing contact areas are constantly changing during such rotation. Also, passages may be provided leading to the lubricant reservoir. Means are provided for preventing rotation of the coil spring with respect to the cone within which it is positioned.

As previously mentioned, the wound wire can have numerous cross-sectional shapes provided that two principal conditions are met: the surface areas thereof which are in actual contact with opposed surfaces of the other bearing member are spaced apart in order to reduce the bearing contact area; and areas or regions are provided between such spaced bearing surface areas for trapping debris particles and for the circulation of a cooling fluid or the presence of lubricant, which could be of the solid form. In general, if one envisions a radial thrust bearing as including a stationary member and a rotating member, with the rotating member having a wound wire form, the rotating member will be in continuous contact with the stationary member at points which an instant before contact were exposed to lubricant. The points of contact on the stationary member are, therefore, continuously changing and moving radially along the stationary member. Such movement of the points of contact allows utilization of the entire bearing surface area of the stationary member and the distribution of wear evenly across its area even though the bearing surface contact area at any instant has been substantially reduced. Another benefit of this wiping action of the rotating member over the stationary member is the displacement or pumping of lubricant which can take place to and from the lubricant reservoir or other parts of a rock bit through suitable lubricant passages. A principal advantage of such lubricant circulation is the reduction of wear and bearing operating temperatures, thereby prolonging the life of a rock bit. Of course the direction of lubricant circulation is determined by the right or left hand winding of the spring coils and by the direction of relative rotation between the bearing members. Moreover it will be recognized that the coiled form of the wire bearing provides a certain amount of self-aligning capability to maintain a substantial contact area and avoid point loads or points of high stress concentration, local high temperatures, and localized wear over the life of the bearing. The inherent flexibility of the coil tends to distribute the load among several separated bearing areas, since each coil turn can be considered to have a degree of freedom for independent motion in the axial and circumferential directions. It also should be noted that since coil springs are readily available and somewhat inexpensive items, the present invention provides a very cost effective bearing structure compared to prior art structures and techniques for making drill bit bearings where special hard metal inlays and hard facings have resulted in higher bit costs.

BRIEF DESCRIPTION OF THE DRAWINGS

The present invention has other objects, features and advantages which will become more clearly apparent in connection with the following detailed description of one or more preferred embodiments, taken in conjunction with the appended drawings in which.

DESCRIPTION OF PREFERRED EMBODIMENTS

Figure 1:
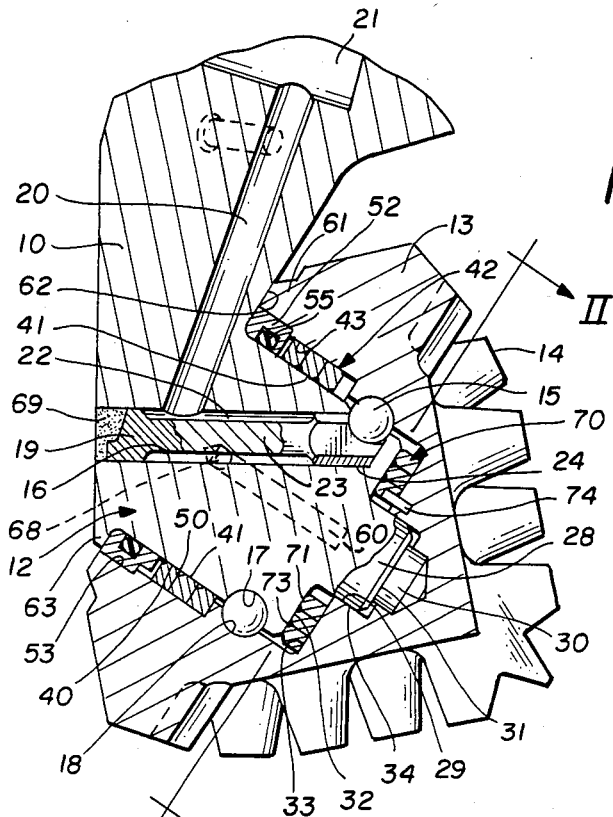
FIG. 1 is a vertical sectional view of the arm, bearing pin and cone of a rock bit that incorporates a bearing structure constructed in accordance with the present invention.
Figure 3:
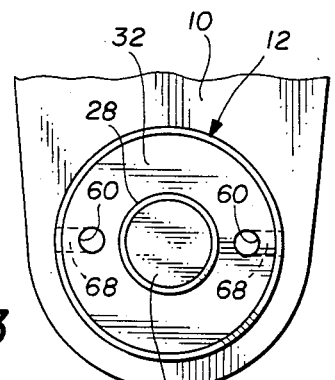
FIG. 3 is an end view of the bearing pin shown in FIG. 1, with the cone removed.

Referring initially to FIG. 1, the depending arm 10 of a drill bit body has an inwardly extending journal bearing pin 12 formed integrally therewith. A rotary cutter element or cone 13 is rotatably mounted on the bearing pin 12, and has a suitable cutting structure indicated generally at 14 on its outer periphery. The cutting structure 14 can have milled teeth as shown, or tungsten carbide inserts, or any other cutter elements capable of penetrating the rock and making hole as the drill bit is turned on bottom by the drill string. Of course the typical rock bit has a plurality of such arms, pins and cones, however a single assembly has been illustrated for purposes of explaining the structure and operation of the present invention. The cone 13 is retained on the bearing pin 12 by suitable means such as a plurality of balls 15 that are inserted through a ball passageway 16 and into position between opposed annular raceways or grooves 17 and 18 formed in the bearing pin 12 and the cone 13, respectively. A ball plug 19 subsequently inserted into the passageway 16 and secured to the arm 10 functions to retain the balls 15 in the raceways. Of course other means of cone retention may be employed. A passage 20 that leads from a lubricant chamber 21 to the ball passageway 16 enables a supply of lubricant to reach the annular area 22 between the central region 23 of the ball plug 19 and to be communicated past the head 24 of the plug to the various clearances and bearing surfaces between the pin and cone. These passages and a suitable pressure transmitting element (not shown) located in the reservoir 21 and an O-ring seal 55 enable the pressure of the lubricant to be substantially equalized with that of the drilling fluid outside the drill bit body.

The inner end portion 28 of the bearing pin 12 has a reduced diameter cylindrical configuration to provide a pilot pin that fits into a counterbore 29 in the cone 13. A thrust button 30 that is press fitted into the lowermost cavity of the cone 13 engages the end face 31 of the pilot pin 28. The thrust button 30 and the axially opposed faces 32 and 33 on the end of the bearing pin 12 and the cone 13 carry thrust loading during operation of the bit. The outer surface 34 of the pilot pin 28 opposes and engages the mating inner cylindrical wall surface of the bore 29 of the cone 13 to provide a nose or radial bearing.

In accordance with one aspect of the present invention, the bearing structure by which the cone 13 is rotatably mounted on the bearing pin 12 comprises a closed, helical coiled spring 42 that is received in a counterbore 43 in the cone 13 terminating in a radially extending shoulder. The coil spring bearing structure 42 is constructed and operable as fully described and claimed in U.S. Pat. No. 4,514,089 of which the present application is a divisional. Thus, the structure identified by the reference numerals of FIG. 1 hereof is fully discussed in the above patent which is herein incorporated by reference.

Figure 2:
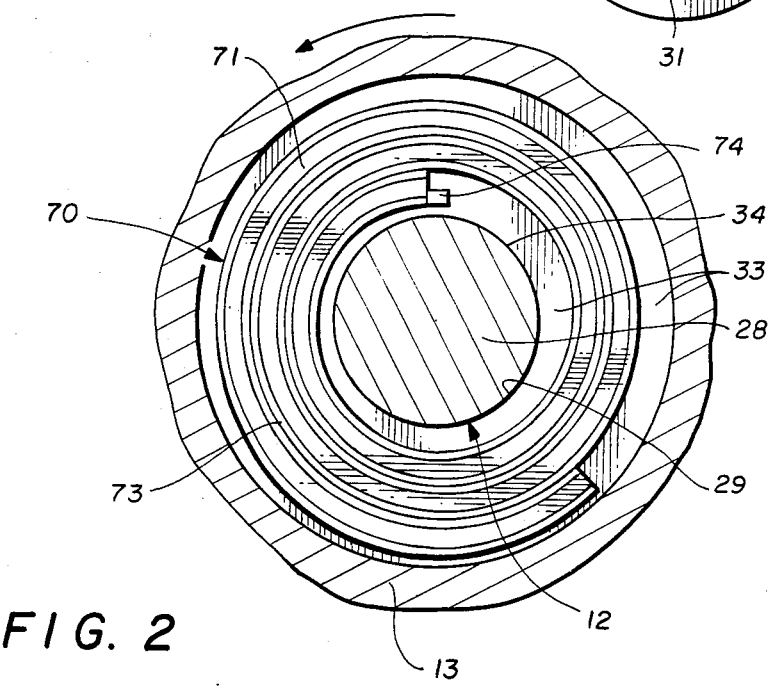
FIG. 2 is a vertical sectional view along line II—II of FIG. 1, with the arrow showing the direction of cone rotation during normal operation.

In accordance with another aspect of the present invention an axial or thrust bearing is provided in conjunction with or independently of the bearing structure of the above patent to operate between the thrust flange faces 32 and 33 of the bit. The thrust bearing structure comprises a spiral wound wire member 70 that is seated on face 33 of the cone 13 so that it opposes and engages the planar face 32 of the pin 12. When considered in cross section taken on a radial line, the spiral spring 70 having a similar cross sectional configuration as described bearing spring 42 of the previously incorporated patent will present radially spaced surface areas 71 that engage the bearing surface 32 of the pin, with combination debris trap-lubricant space 73, comprising, as clearly shown in FIG. 2, a continous spiral configuration being provided between such spaced surface areas. The spiral wound bearing 70 preferably is fixed against rotation relative to the cone thrust flange face 33 by means of a pin 74, or any other suitable means so as to maximize the pumping of lubricant. The pumping or movement of lubricant can be biased in a direction from the inner area of the bearing toward the outside or from the outside toward the inner area, depending upon right hand or left hand winding of the spiral coils and the direction of relative motion between the thrust bearing members. Of course as in the case of the wound wire radial bearing, the wound wire thrust bearing does not have to be fixed with respect to one of the bearing members. Bearing materials can be selected and bearing surfaces can be textured in such a way to predetermine the amount of friction between the members, and thus the amount of relative rotation or floating action of the wound wire bearing according to the operating or service conditions.

It now will be recognized that a new and improved wound wire friction bearing structure has been provided that has general application and is particularly useful in rock bits. Since certain changes or modifications may be made in the disclosed embodiments without departing from the inventive concepts involved, it is the aim of the appended claims to cover all such changes and modifications falling within the true spirit and scope of the present invention.

The embodiments of the invention in which an exclusive property or privilege is claimed are defined as follows:

1. A thrust bearing structure comprising:
a first planar bearing surface;
a bearing member providing an opposed planar second bearing surface in load bearing rotatable engagement with said first surface about an axis, said second bearing member comprising a continuous wire wound spirally and having adjacent convolutions formed in a common plane thereby defining said planar second bearing surface and having sidewalls of adjacent convolutions in abutting engagement, said sidewalls being relieved adjacent said second bearing surface to define a groove between the common planar surface of adjacent convolutions, and wherein said adjacent convolutions are relatively moveable with respect to each other.

2. Structure according to claim 1 wherein said groove is a non-interrupted spiral groove throughout said second bearing surface.

3. Structure according to claim 1 wherein said second bearing surface is a continuous spiral surface of said wire.

4. Thrust bearing structure for a rotatably mounted earth boring cutter having an axle member with said cutter rotatably mounted thereon, said axle member and said cutter defining generally complimentary radially extending axially facing surfaces for supporting axial thrust loads therebetween, said axially facing surface on said axle member defining a first thrust bearing surface and, a bearing member disposed on said axial facing surface of said cutter for rotatable bearing engagement with said first thrust bearing surface, said bearing member comprising:
a continuous wire wound spirally and having adjacent convolutions formed in a common plane thereby defining a planar second bearing surface and having sidewalls of adjacent convolutions in abutting engagement, said sidewalls being relieved adjacent said second bearing surface to define a groove between the common planar surface of adjacent convolutions, and wherein said adjacent convolutions are relatively moveable with respect to each other.

5. Structure according to claim 4 wherein said groove is a non-interrupted spiral groove throughout said second bearing surface.

6. Structure according to claim 5 wherein said second bearing surface is a continuous spiral surface of said wire.

7. Structure according to claim 6 wherein said cutter includes structure abutting one end of said wire member for positive driving engagement therebetween.

8. Structure according to claim 7 wherein said spiral groove provides during relative rotation between said first and second bearing surfaces, a lubricant pump for transporting lubricant within said groove along said first bearing surface.

* * * * *